United States Patent
Bertollini et al.

(10) Patent No.: US 10,800,403 B2
(45) Date of Patent: Oct. 13, 2020

(54) AUTONOMOUS RIDE DYNAMICS COMFORT CONTROLLER

(71) Applicant: GM GLOBAL TECHNOLOGY OPERATIONS LLC, Detroit, MI (US)

(72) Inventors: Gary P. Bertollini, Lake Orion, MI (US); Joseph F. Szczerba, Grand Blanc, MI (US); Roy J. Mathieu, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 334 days.

(21) Appl. No.: 15/978,291

(22) Filed: May 14, 2018

(65) Prior Publication Data

US 2019/0344783 A1 Nov. 14, 2019

(51) Int. Cl.
| | | |
|---|---|---|
| *B60W 30/02* | (2012.01) | |
| *B60W 40/06* | (2012.01) | |
| *B60W 50/00* | (2006.01) | |
| *G05D 1/00* | (2006.01) | |
| *G05D 1/02* | (2020.01) | |

(52) U.S. Cl.
CPC ......... *B60W 30/025* (2013.01); *B60W 40/06* (2013.01); *B60W 50/0098* (2013.01); *G05D 1/0088* (2013.01); *G05D 1/0214* (2013.01); *B60W 2050/0031* (2013.01); *G05D 2201/0213* (2013.01)

(58) Field of Classification Search
CPC ............... B60W 30/025; B60W 40/06; B60W 50/0098; B60W 2050/0031; B60W 2552/35; B60W 60/0013; B60W 2050/0043; G05D 1/0088; G05D 1/0214; G05D 2201/0213
USPC ....................................... 701/1, 48
See application file for complete search history.

(56) References Cited

U.S. PATENT DOCUMENTS

| | | | | |
|---|---|---|---|---|
| 7,778,741 | B2 * | 8/2010 | Rao ..................... | B60C 23/0408 340/440 |
| 8,280,623 | B2 * | 10/2012 | Trepagnier ........... | G05D 1/0214 701/301 |
| 10,120,385 | B2 * | 11/2018 | Connor ................ | G05D 1/0214 |
| 10,254,122 | B2 * | 4/2019 | Bills ................... | G01C 21/3484 |
| 10,486,485 | B1 * | 11/2019 | Levinson ........... | B60W 50/0098 |

(Continued)

*Primary Examiner* — Jaime Figueroa
(74) *Attorney, Agent, or Firm* — Lorenz & Kopf, LLP

(57) ABSTRACT

A processor-implemented path planning method in a vehicle is disclosed. The method includes retrieving road surface information along a planned path for the vehicle; constructing, by the processor, a model of the road surface along the planned path; identifying, by the processor, a road irregularity in the road surface for the planned path; classifying, by the processor, the road irregularity; projecting the location of vehicle tire patches on the model of the road surface; predicting, by the processor, vehicle sprung-mass dynamics as a function of time for the vehicle along the planned path; calculating a plurality of alternative path trajectories within the constraints of the road boundaries for avoiding the road irregularity; choosing an alternative path trajectory out of the plurality of alternative path trajectories that reduces the sprung-mass dynamics for the vehicle to provide a more comfortable ride; and updating the planned path with the chosen alternative path trajectory.

20 Claims, 8 Drawing Sheets

(56) References Cited

U.S. PATENT DOCUMENTS

| | | | |
|---|---|---|---|
| 2012/0101680 A1* | 4/2012 | Trepagnier | G05D 1/0214 |
| | | | 701/26 |
| 2014/0297116 A1* | 10/2014 | Anderson | B60G 11/265 |
| | | | 701/37 |
| 2015/0224845 A1* | 8/2015 | Anderson | B60G 17/052 |
| | | | 701/37 |
| 2017/0232915 A1* | 8/2017 | Dufford | G01C 21/343 |
| | | | 701/48 |
| 2017/0285646 A1* | 10/2017 | Connor | B60W 10/184 |
| 2018/0038705 A1* | 2/2018 | Bills | G05D 1/0212 |
| 2018/0202822 A1* | 7/2018 | DeLizio | G01C 21/3407 |

* cited by examiner

AUTONOMOUS RIDE DYNAMICS COMFORT CONTROLLER

TECHNICAL FIELD

The present disclosure generally relates to autonomous vehicles, and more particularly relates to systems and methods in an autonomously driven vehicle for adjusting vehicle performance to reduce the effect of road anomalies on rider comfort.

BACKGROUND

Autonomously driven vehicles are equipped with sensors that can sense road conditions. For example, a camera or lidar sensor in an autonomously driven vehicle may sense a road irregularity such as a pothole in the planned path for the vehicle. Driving over a road irregularity, such as a pothole, may provide a level of discomfort to passengers riding in the vehicle. Many modern vehicles are equipped with actuators that may be engaged to adjust vehicle performance. For example, actuators for speed, braking, and/or steering control may be controlled to adjust vehicle performance.

Accordingly, it is desirable to provide systems and methods for automatically adjusting the response of an autonomously driven vehicle to upcoming road hazards in a planned path of the vehicle. Furthermore, other desirable features and characteristics of the present invention will become apparent from the subsequent detailed description and the appended claims, taken in conjunction with the accompanying drawings and the foregoing technical field and background.

SUMMARY

Systems and method are provided for reducing the impact of road irregularities on passengers in the vehicle. In one embodiment, a processor-implemented path planning method in a vehicle is provided. The method includes retrieving road surface information along a planned path for the vehicle; constructing, by the processor, a model of the road surface along the planned path; identifying, by the processor, a road irregularity in the road surface for the planned path; classifying, by the processor, the road irregularity; projecting the location of vehicle tire patches on the model of the road surface; predicting, by the processor, vehicle sprung-mass dynamics as a function of time for the vehicle along the planned path; calculating a plurality of alternative path trajectories within the constraints of the road boundaries for avoiding the road irregularity; choosing an alternative path trajectory out of the plurality of alternative path trajectories that reduces the sprung-mass dynamics for the vehicle to provide a more comfortable ride; and updating the planned path with the chosen alternative path trajectory.

In one embodiment, the road surface information includes cloud-based road surface information and road surface information derived from onboard vehicle sensors.

In one embodiment, the model of the road surface along the planned path includes a three-dimensional (3D) profile matrix wherein the x-axis represents the distance down road, the y-axis represents the lateral position, and the z-axis represents the vertical position.

In one embodiment, the method further includes uploading the 3D profile matrix to a cloud-based system for comparison with a cloud-based 3D profile matrix.

In one embodiment, predicting vehicle sprung-mass dynamics as a function of time includes predicting forces at each kingpin using a representative vehicle dynamics model.

In one embodiment, calculating a plurality of alternative path trajectories and choosing an alternative path trajectory out of the plurality of alternative path trajectories includes calculating and testing using cost functions a plurality of alternative path trajectories.

In one embodiment, choosing an alternative path trajectory that reduces the sprung-mass dynamics for the vehicle includes choosing an alternative path that does not avoid the road irregularity but reduces the impact of the road irregularity on ride comfort.

In one embodiment, choosing an alternative path trajectory that reduces the sprung-mass dynamics for the vehicle includes choosing an alternative path that avoids the road irregularity.

In another embodiment, a ride comfort processor in a vehicle is disclosed. The ride comfort processor includes one or more processors configured by programming instructions in computer readable media. The ride comfort processor is configured to: retrieve road surface information along a planned path for the vehicle; construct a model of the road surface along the planned path; project the location of vehicle tire patches on the model of the road surface; predict vehicle sprung-mass dynamics as a function of time for the vehicle along the planned path; calculate and select alternative vehicle controls that reduce the sprung-mass dynamics along the planned path; and update vehicle control inputs with the alternative vehicle controls.

In one embodiment, the ride comfort processor is further configured to: identify a road irregularity in the road surface for the planned path; and classify the road irregularity;

In one embodiment, to calculate and select alternative vehicle controls that reduce the sprung-mass dynamics along the planned path, the ride comfort processor is configured to: calculate a plurality of alternative path trajectories within the constraints of the road boundaries for avoiding the road irregularity; and choose an alternative path trajectory out of the plurality of alternative path trajectories that reduces the sprung-mass dynamics for the vehicle to provide a more comfortable ride.

In one embodiment, to update vehicle control inputs with the alternative vehicle controls, the ride comfort processor is configured to update the planned path with the chosen alternative path trajectory.

In one embodiment, to predict vehicle sprung-mass dynamics as a function of time for the vehicle along the planned path, the ride comfort processor is configured to: receive a driving controls input profile for lateral and longitudinal control and calculate predicted surface response plots representing ride and handling dynamics for the vehicle from future state tire inputs and stochastic wind forcing functions.

In one embodiment, to calculate and select alternative vehicle controls that reduce the sprung-mass dynamics along the planned path, the ride comfort processor is configured to apply a heuristic driving controls adjustment module to define control signals for stability control, steering, and braking actuators.

In one embodiment, the ride comfort processor is further configured to measure vehicle dynamic response after implementing the control signals and adjust control gains in the heuristic driving controls adjustment module.

In one embodiment, to adjust control gains in the heuristic driving controls adjustment module, the ride comfort processor is configured to: compare actual vehicle sprung-mass dynamics using the control signals to the predicted vehicle sprung-mass dynamics; when the actual vehicle sprung-mass dynamics are not improved from the predicted vehicle sprung-mass dynamics, the ride comfort processor is configured to adjust the control gains using a learning algorithm; and when the actual vehicle sprung-mass dynamics are improved from the predicted vehicle sprung-mass dynamics, the ride comfort processor is configured to confirm the control gains.

In one embodiment, the ride comfort processor is further configured to send the control signals to a cloud-based server.

In another embodiment, a method in a vehicle for improving driver comfort is provided. The method includes scanning a roadway along a planned path to create an actual road surface profile; comparing the actual road surface profile with a road surface profile from a cloud-based database, determining differences, and updating a cloud-based server with the differences; calculating, using the actual road surface profile, predicted tire patch locations along the planned path to create a time series forcing function for each vehicle tire; receiving a driving controls input profile; calculating predicted surface response plots representing ride and handling dynamics for the vehicle from future state tire inputs and stochastic wind forcing functions; applying a heuristic driving controls adjustment module to define control signals to improve driver comfort using cloud data, surrounding traffic behavior, surface mu, road material and weather conditions; and sending input control parameters from the control signals to the cloud-based server to store in the cloud-based database.

In one embodiment, the method further includes measuring vehicle dynamic response after implementing the control signals and adjusting control gains in the heuristic driving controls adjustment module.

In one embodiment, adjusting control gains in the heuristic driving controls adjustment module includes: when actual vehicle sprung-mass dynamics are not improved using the control signals, adjusting the control gains using a learning algorithm; and when the actual vehicle sprung-mass dynamics are improved confirming the control gains.

In another embodiment, a ride comfort processor in a vehicle is disclosed. The ride comfort processor includes one or more processors configured by programming instructions in computer readable media. The ride comfort processor is configured to: retrieve road surface information along a planned path for the vehicle; construct a model of the road surface along the planned path; identify a road irregularity in the road surface for the planned path; classify the road irregularity; project the location of vehicle tire patches on the model of the road surface; predict vehicle sprung-mass dynamics as a function of time for the vehicle along the planned path; calculate a plurality of alternative path trajectories within the constraints of the road boundaries for avoiding the road irregularity; choose an alternative path trajectory out of the plurality of alternative path trajectories that reduce the sprung-mass dynamics for the vehicle; and update the planned path with the chosen alternative path trajectory.

In another embodiment, a ride comfort processor in a vehicle is disclosed. The ride comfort processor includes one or more processors configured by programming instructions in computer readable media. The ride comfort processor is configured to: scan a roadway along a planned path to create an actual road surface profile; compare the actual road surface profile with a road surface profile from a cloud-based database, determine differences, and update a cloud-based server with the differences; calculate, using the actual road profile, predicted tire patch locations along the planned path to create a time series forcing function for each vehicle tire; receive a driving controls input profile; calculate predicted surface response plots representing ride and handling dynamics for the vehicle from future state tire inputs and stochastic wind forcing functions; apply a heuristic driving controls adjustment module to define control signals to improve driver comfort using cloud data, surrounding traffic behavior, surface mu, road material and weather conditions; and send input control parameters from the control signals to the cloud-based server to store in the cloud-based database.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
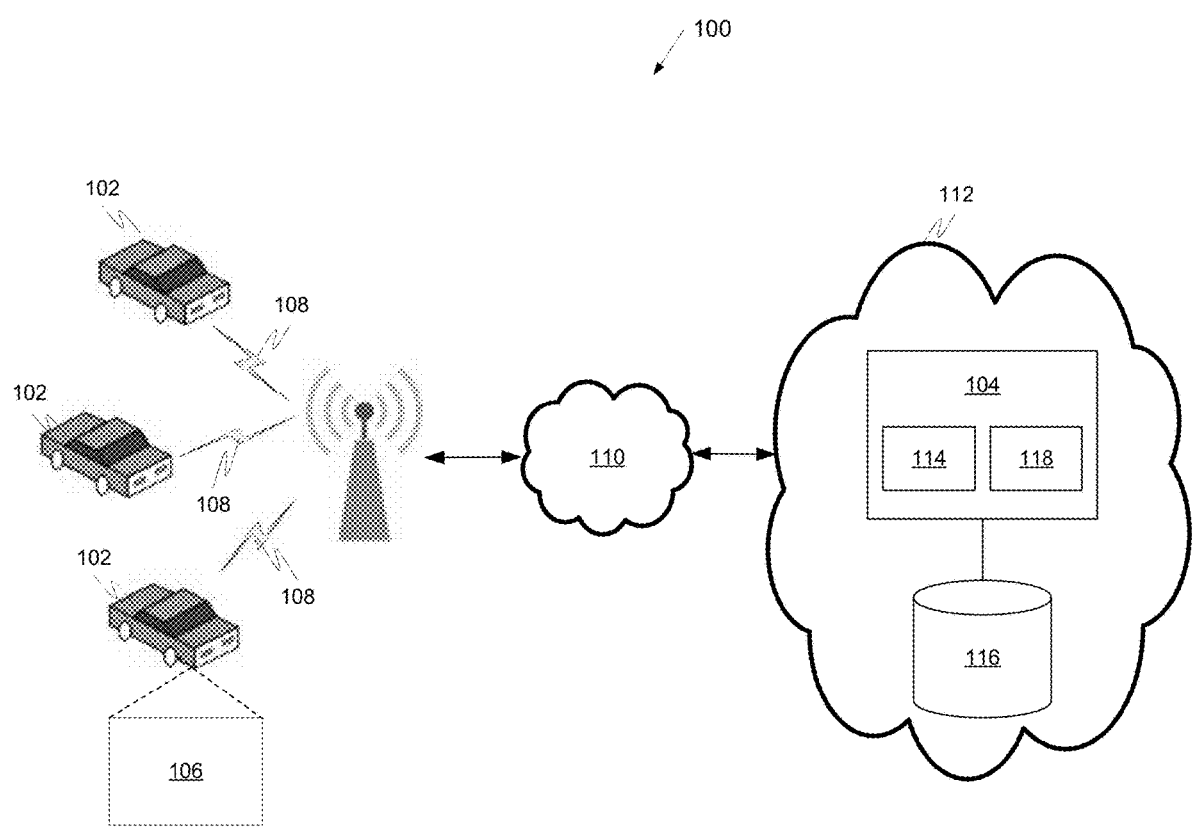
FIG. 1 is a block diagram depicting an example autonomous ride dynamics comfort controller system that allows a vehicle operating in an autonomous mode to avoid road irregularities in a manner that is optimized for passenger comfort, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Apparatus, systems, methods, techniques and articles are described for improving a vehicle's dynamic response to road imperfections and conditions by utilizing existing autonomous vehicle sensors. Onboard sensors, such as cameras, optical sensors, radar sensors, and/or LIDAR sensors may be used to scan the forward surface of the road to allow the vehicle to forecast vehicle dynamic response (e.g., in six degrees of freedom (6 DOF)) to road surface disturbances and to allow the vehicle to proactively make steering adjustments to avoid the road surface disturbances or to counter the effect of road surface disturbances.

Apparatus, systems, methods, techniques and articles are described for scanning the forward surface of the road, sensing surrounding vehicle dynamic response behavior, and using the sensed dynamic response behavior to improve ride comfort. Apparatus, systems, methods, techniques and articles are described for using cloud data combined with LIDAR data to define micro path adjustments to improve ride control. Apparatus, systems, methods, techniques and articles are described for using cloud data to reroute the trajectory of a vehicle to select a path around a road imperfection or surface irregularity to optimize comfort and minimize damage to vehicle components. Apparatus, systems, methods, techniques and articles are described for sensing the type of road (e.g., gravel, dirt) and weather conditions (e.g., rain, snow) to allow the vehicle to adjust vehicle control strategy to improve safety.

FIG. 1 is a block diagram depicting an example autonomous ride dynamics comfort controller system 100 that allows a vehicle operating in an autonomous mode to avoid road irregularities in a manner that is optimized for passenger comfort. The example system 100 includes a plurality of vehicles 102 that may detect driving condition information (including road irregularities) via sensors contained within the vehicles and/or receive driving condition information from a cloud-based server 104.

The example vehicles 102 are equipped with a ride comfort processor 106 that is configured to calculate an alternative path trajectory within the constraints of road boundaries to avoid road irregularities when possible and to reduce motion dynamics for passengers in the vehicle to provide a more comfortable ride. The example ride comfort processor 106 is also configured to adjust driving controls in advance of encountering sensed road irregularities to reduce motion dynamics for passengers in the vehicle to provide a more comfortable ride. The example ride comfort processor 106 is further configured to report detected driving condition information (e.g., sensed road irregularities, alternative path trajectories, dynamic control adjustments, etc.) to the cloud-based server 104. The vehicles 102 may communicate with the cloud-based server 104 via a communication channel 108 (e.g., a cellular channel over a cellular network such as 4G LTE or 4G LTE-V2X or a satellite channel), a public network 110, and a private network 112.

The example cloud-based server 104 is configured to collect the driving condition information from the multiple vehicles 102, store the driving condition information, form a consensus using artificial intelligence and deep learning techniques regarding driving conditions based on the received driving condition information, store the consensus, and share the consensus with the vehicles 102. The driving condition information may include various types of data such as information regarding road construction, potholes, alternative path trajectories, dynamic control adjustments, or other information.

The example cloud-based server 104 includes an event ingestion module 114 for receiving and storing driving condition information in a data store 116 and a consensus generation module 118 for building a consensus regarding driving conditions based on the received driving condition information and storing the consensus in the data store 116. The consensus generation module 114 may for example determine that a driving condition event, such as a detected pothole, occurs at a specific location based on the locations of the pothole event reported by multiple vehicles 102. The reported locations may vary, for example, due to the positioning accuracy of the vehicles 102 and the consensus generation module 114 can build a consensus regarding the location of the reported event.

Figure 2:
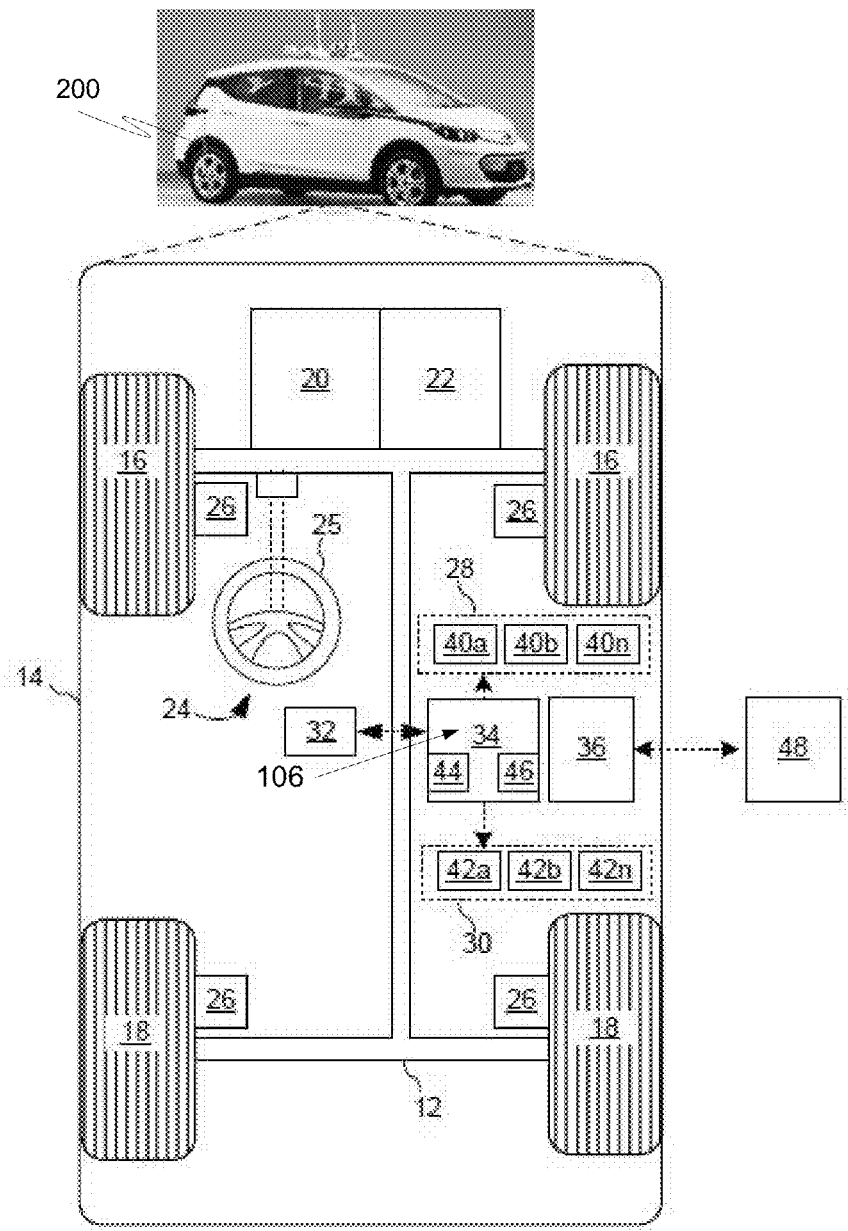
FIG. 2 is a block diagram of an example vehicle that may include a ride comfort processor that is configured to adjust driving controls in advance of encountering sensed road irregularities to reduce motion dynamics for passengers in the vehicle to provide a more comfortable ride, in accordance with various embodiments.

FIG. 2 is a block diagram of an example vehicle 200 that may include a ride comfort processor 106 that is configured to calculate an alternative path trajectory within the constraints of road boundaries to avoid road irregularities and/or to adjust driving controls in advance of encountering sensed road irregularities to reduce motion dynamics for passengers in the vehicle to provide a more comfortable ride. The example vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14.

The example vehicle 200 may be an autonomous vehicle (e.g., a vehicle that is automatically controlled to carry passengers from one location to another) or a semi-autonomous vehicle (e.g., a vehicle that can be autonomously driven to carry passengers from one location to another) and the ride comfort processor 106 is incorporated into the vehicle 200. The example vehicle 200 is depicted as a passenger car but may also be another vehicle type such as a motorcycle, truck, sport utility vehicle (SUV), recreational vehicles (RV), marine vessel, aircraft, etc.

The example vehicle 200 includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 200 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 200 may also include interior and/or exterior vehicle features not illustrated in FIG. 2, such as various doors, a trunk, and cabin features such as air, music, lighting, touch-screen display components (such as those used in connection with navigation systems), and the like.

The data storage device 32 stores data for use in the vehicle 200. In various embodiments, the data storage device 32 stores defined maps of the navigable environment. In various embodiments, the defined maps may be predefined by and obtained from a remote system. For example, the defined maps may be assembled by the remote system and communicated to the vehicle 200 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 200. In various embodiments, controller 34 is configured to implement a ride comfort processor 106 as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for controlling the components of the vehicle 200, and generate control signals that are transmitted to the actuator system 30 to automatically control the components of the vehicle 200 based on the logic, calculations, methods, and/or algorithms. Although only one controller 34 is shown in FIG. 2, embodiments of the vehicle 200 may include any number of controllers 34 that communicate over a suitable communication medium or a combination of communication mediums and that cooperate to process the sensor signals, perform logic, calculations, methods, and/or algorithms, and generate control signals to automatically control features of the vehicle 200.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 3:
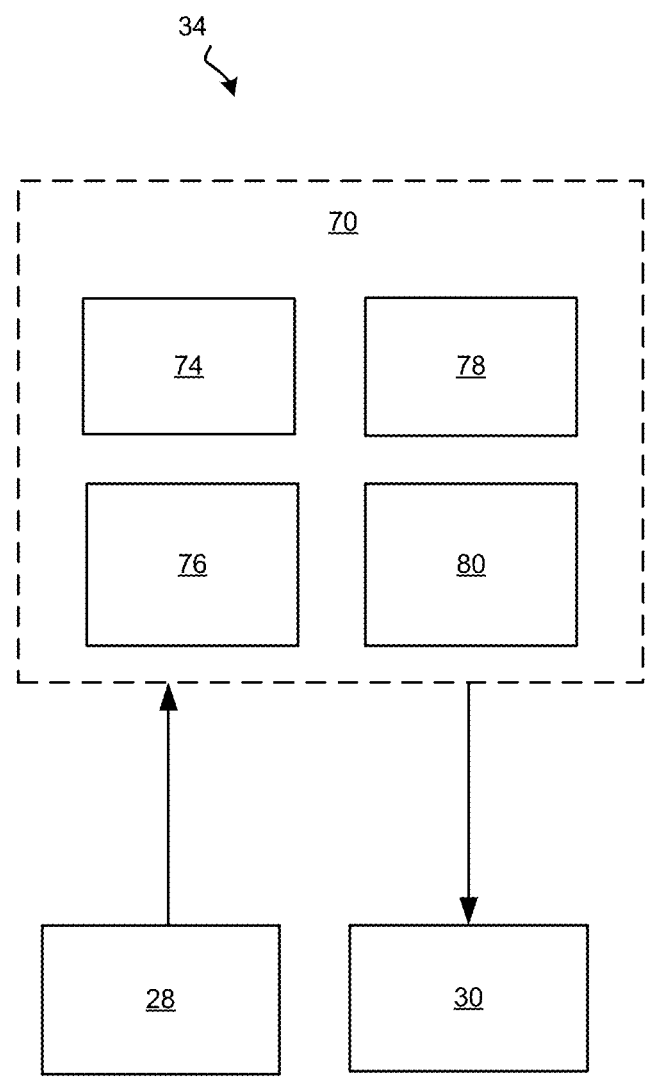
FIG. 3 is functional block diagram illustrating an autonomous driving system (ADS) associated with an autonomous vehicle, in accordance with various embodiments.

FIG. 3 is functional block diagram illustrating an autonomous driving system (ADS) associated with an autonomous vehicle. In accordance with various embodiments, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with the vehicle 200.

In various embodiments, the instructions of the autonomous driving system 70 may be organized by function or system. For example, as shown in FIG. 3, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 200. In various embodiments, the perception system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 200 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 200 to follow. The vehicle control system 80 generates control signals for controlling the vehicle 200 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the ride comfort processor 106 may be included within the perception system 74, the positioning system 76, the path planning system 78, and/or the vehicle control system 80. As mentioned briefly above, the ride comfort processor 106 is configured to calculate an alternative path trajectory within the constraints of road boundaries to avoid road irregularities and/or to adjust driving controls in advance of encountering sensed road irregularities to reduce motion dynamics for passengers in the vehicle to provide a more comfortable ride.

Figure 4:
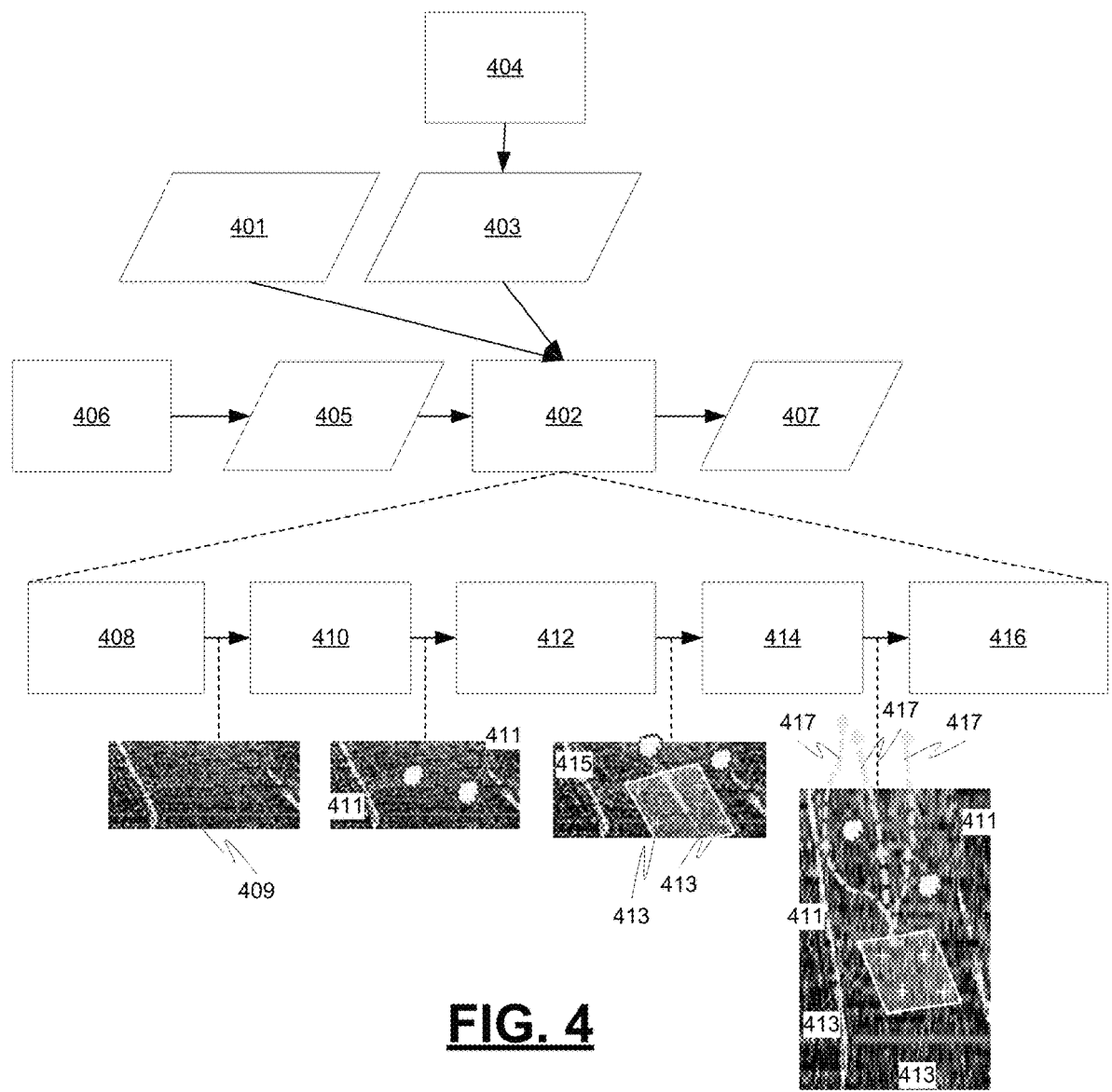
FIG. 4 is a block diagram depicting an example ride comfort processor in a vehicle, in accordance with various embodiments.

FIG. 4 is a block diagram depicting an example ride comfort processor 402 in a vehicle. The example ride comfort processor 402 comprises one or more processors configured by programming instructions in computer readable media. The example ride comfort processor 402 is configured to retrieve road surface information along a planned path for the vehicle. The road surface information may include cloud-based road surface information 401 from a cloud-based server (e.g., cloud-based server 104) and sensor-based road surface information 403 from vehicle sensors 404 (such as cameras, lidar, radar, ultrasonic, etc.). The planned path 405 may be generated by an autonomous path planner 406 (e.g., path planning system 78).

The example ride comfort processor 402 is configured to analyze the road surface information along the planned path for the vehicle, identify one or more road irregularities, calculate and select alternative vehicle controls that reduce the vehicle's sprung-mass dynamics along the planned path in view of the road irregularities, and update vehicle control inputs with the alternative vehicle controls. In this example, to calculate and select alternative vehicle controls that reduce the sprung-mass dynamics along the planned path, the example ride comfort processor 402 is configured to calculate a plurality of alternative path trajectories within the constraints of the road boundaries for avoiding the road irregularities and choose an alternative path trajectory out of the plurality of alternative path trajectories that reduces the sprung-mass dynamics (e.g., response/frequency) for the vehicle to provide a more comfortable ride and/or avoid the road irregularities.

The example ride comfort processor 402 includes a roadway model generation module 408, a road irregularity classifier 410, a vehicle sprung-mass dynamics calculator 412, an alternative path trajectory calculator 414, and a planned path adjustment module 416. The roadway model generation module 408 is configured to construct a model 409 of the road surface along the planned path. The road irregularity classifier 410 is configured to identify one or more road irregularities 411 on the road surface for the planned path and classify the road irregularities 411.

The vehicle sprung-mass dynamics calculator 412 is configured to project the location of vehicle tire patches 413 on the model of the road surface and predict vehicle sprung-mass dynamics as a function of time for the vehicle 415 along the planned path. To predict vehicle sprung-mass dynamics as a function of time for the vehicle 415 along the planned path, the vehicle sprung-mass dynamics calculator 412 is configured to receive driving controls input profile (e.g., for lateral and longitudinal control) and calculate predicted surface response plots representing ride and handling dynamics for the vehicle from future state tire inputs and stochastic wind forcing functions.

The alternative path trajectory calculator 414 is configured to calculate and select alternative vehicle controls that reduce the sprung-mass dynamics along the planned path. To calculate and select alternative vehicle controls that reduce the sprung-mass dynamics along the planned path, the alternative path trajectory calculator 414 is configured to calculate a plurality of alternative path trajectories 417 within the constraints of the road boundaries for avoiding the road irregularities 411 and choose one alternative path trajectory out of the plurality of alternative path trajectories 417 that reduces the sprung-mass dynamics (e.g., response/frequency) for the vehicle to provide a more comfortable ride and/or avoid the road irregularities.

The planned path adjustment module 416 is configured to update vehicle control inputs with alternative vehicle controls. To update vehicle control inputs with alternative vehicle controls, the planned path adjustment module 416 is configured to update the planned path 405 with the chosen alternative path trajectory 407.

Figure 5:
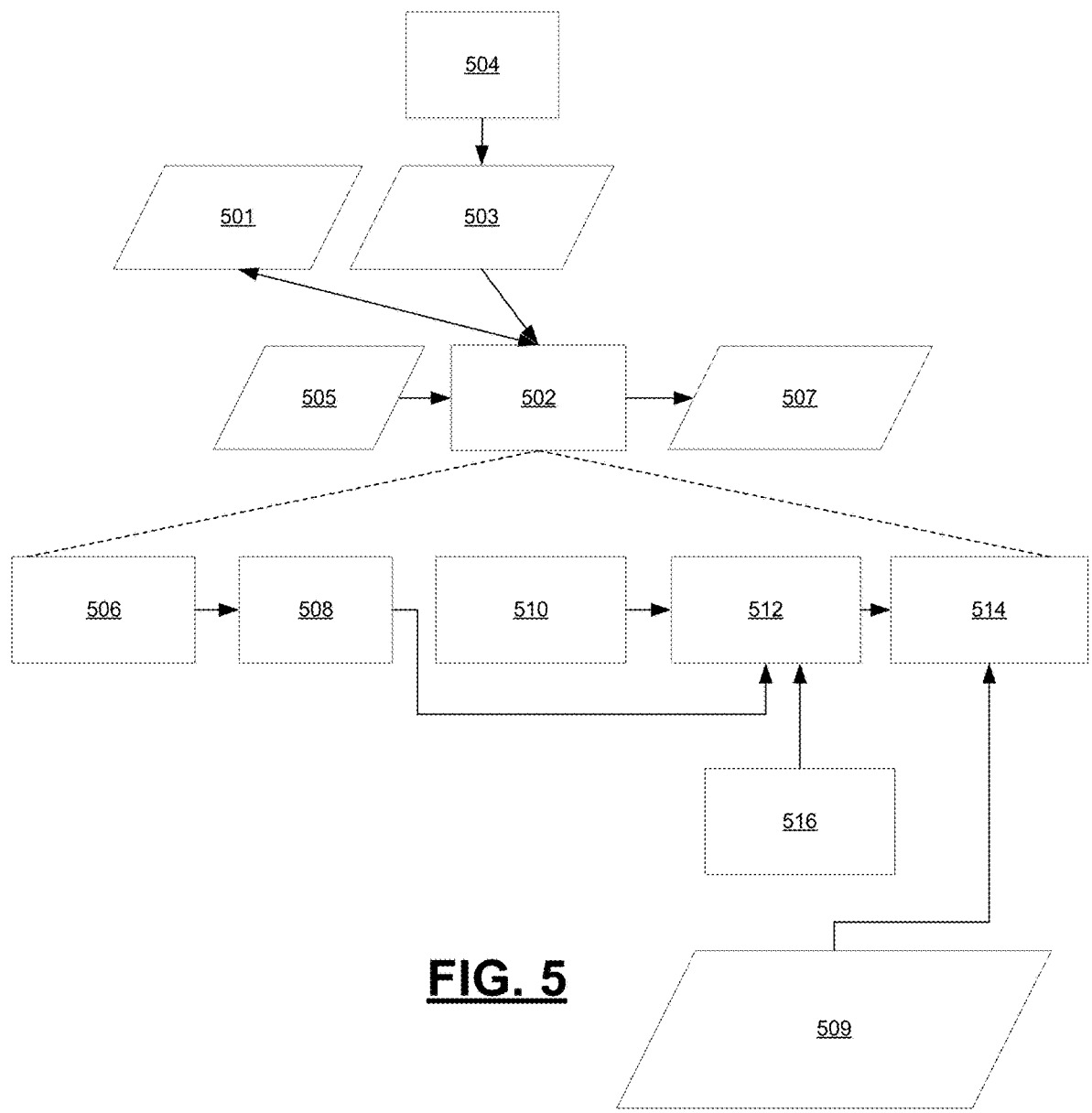
FIG. 5 is a block diagram depicting another example ride comfort processor in a vehicle, in accordance with various embodiments.

FIG. 5 is a block diagram depicting another example ride comfort processor 502 in a vehicle. The example ride comfort processor 502 comprises one or more processors configured by programming instructions in computer readable media. The example ride comfort processor 502 is configured to retrieve road surface information along a planned path for the vehicle. The road surface information may include cloud-based road surface information 501 from a cloud-based server (e.g., cloud-based server 104) and sensor-based road surface information 503 scanned by vehicle sensors 504 (such as cameras, lidar, radar, ultrasonic, etc.). The example ride comfort processor 502 is configured to retrieve driving control signals 505 (e.g., for lateral and longitudinal control), for example, from vehicle control system 80.

The example ride comfort processor 502 is configured to analyze the road surface information along the planned path and/or vehicle driving control signals for the vehicle, identify one or more road irregularities, calculate and select alternative vehicle control signals 507 that reduce the vehicle's sprung-mass dynamics along the planned path in view of the road irregularities, and update the vehicle control signals with alternative vehicle control signals. The example ride comfort processor 502 is further configured to send updated input control parameters from the control signals 507 to a cloud server to store in a cloud-based database.

The example ride comfort processor 502 includes a road surface profile generation module 506, a road surface profile comparator 508, a vehicle tire patch time series calculator 510, a predicted surface response calculator 512, and a heuristic driving controls adjustment module 514. The road surface profile generation module 506 is configured to construct a model of the road surface (e.g., a constructed road surface profile) along the planned path using the retrieved road surface information. The road surface profile comparator 508 is configured to compare the constructed road surface profile and a cloud-based road surface profile retrieved from the cloud-based server, determine differences between the two profiles and provide an update to the cloud-based server with the differences. The vehicle tire patch time series calculator 510 is configured to project the location of vehicle tire patches on the model of the road surface and calculate, using the constructed road profile, future tire locations tire patches to create a time series forcing function for each vehicle tire.

The predicted surface response calculator 512 is configured to predict the vehicle surface response over the planned path. To predict the surface response, the predicted surface response calculator 512 is configured to receive a driving controls input profile 505 (e.g., for lateral and longitudinal control), the constructed road surface profile, the time series forcing function for each vehicle tire, and stochastic wind forcing functions 516. Based on these received inputs, the predicted surface response calculator 512 is further configured to calculate predicted surface response plots representing ride and handling dynamics for the vehicle using a prediction module.

The heuristic driving controls adjustment module 514 is configured to calculate and select alternative vehicle control signals 507 that reduce the sprung-mass dynamics along the planned path. To calculate and select alternative vehicle control signals 507 that reduce the sprung-mass dynamics along the planned path, the heuristic driving controls adjustment module 514 is configured to define control signals 507 (e.g., for stability control, steering, braking, ride) intended to optimize driver comfort and ride using various inputs 509 such as vehicle sensor data, cloud data, surrounding traffic behavior, road surface mu, road surface material, and weather conditions. The heuristic driving controls adjustment module 514 is further configured to compare actual vehicle sprung-mass dynamics using the selected alternative vehicle control signals 507 to the predicted vehicle sprung-mass dynamics and adjust control gains in the prediction model as needed. When the actual vehicle sprung-mass dynamics are not improved from the predicted vehicle sprung-mass dynamics, the driving controls adjustment module 514 is configured to adjust control gains in the prediction module using a learning algorithm and save input control parameters associated with at least one of location, driving sequence, environmental factors, or combination of two or more of each. When the actual vehicle sprung-mass dynamics are improved from the predicted vehicle sprung-mass dynamics, the driving controls adjustment module 514 is configured to confirm the control gains and save input control parameters associated with at least one of location, driving sequence, environmental factors, or combination of two or more of each.

Figure 6:
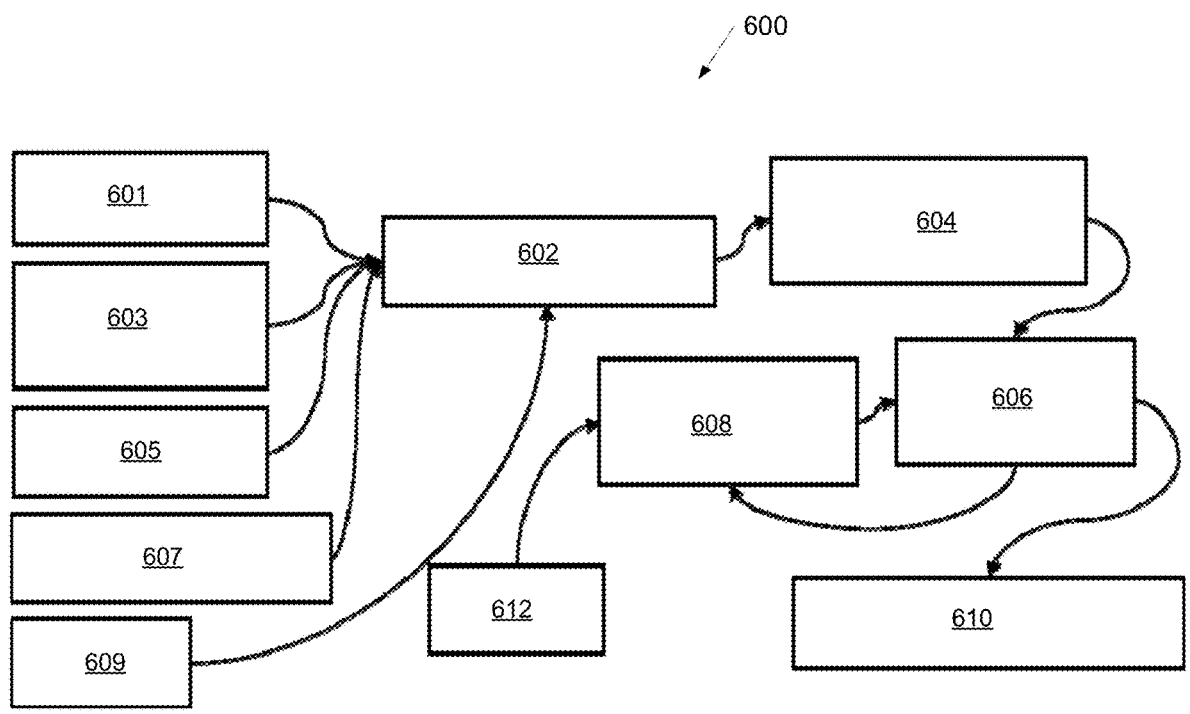
FIG. 6 is a block diagram depicting an example system in a vehicle for reducing the impact of road irregularities to passengers in the vehicle, in accordance with various embodiments.

FIG. 6 is a block diagram depicting an example system 600 in a vehicle for reducing the impact of road irregularities to passengers in the vehicle. The example system 600 comprises one or more processors configured by programming instructions in computer readable media. The example system 600 includes a vehicle location and tire forces prediction module 602, a net predicted vehicle disturbance deviation module 604, a compensatory pre-control loading module 606, and a prediction algorithm adaption module 608. The example system 600 is configured to retrieve road surface information, predict the effects that irregularities in the road surface may have on the ride comfort of a passenger, calculate actuator control signals to reduce the effect of road irregularities on ride comfort, measure the actual vehicle performance using the calculated actuator control signals, and adjust an algorithm that is configured to calculate actuators control signals to reduce the effect of road irregularities on ride comfort.

The example vehicle location and tire forces prediction module 602 is configured to retrieve road surface information by retrieving a surface profile scan 601 (e.g., derived from onboard vehicle sensors such as lidar, radar, ultrasonic, etc.) of a road along a planned path for the vehicle, cloud-based road surface information 603 from a cloud-based road surface profile database, a road surface image 605 (e.g., from a vehicle-based imaging device such as a camera), and surrounding vehicles ride motion information 607. The example vehicle location and tire forces prediction module 602 is also configured to retrieve navigational information 609 from onboard vehicle navigational sensors, such as GPS. The example vehicle location and tire forces prediction module 602 is further configured to calculate, using the retrieve information, predicted vehicle location and tire forces along the planned path for the vehicle.

The example net predicted vehicle disturbance deviation module 604 is configured to predict the effects that irregularities in the road surface may have on the ride comfort of a passenger. The example net predicted vehicle disturbance deviation module 604 is configured to analyze the predicted vehicle location and tire forces to predict the net predicted vehicle disturbance deviation due to the irregularities in the road surface.

The example compensatory pre-control loading module 606 is configured to calculate changes to actuator control signals to reduce the effect of road irregularities on ride comfort. The example compensatory pre-control loading module 606 is configured to calculate alternative paths, select an alternative path within the constraints of the road, and calculate changes to actuator control signals to achieve the selected alternative path that may reduce the effect of road irregularities on ride comfort. Alternatively or additionally, the example compensatory pre-control loading module 606 is configured to calculate changes to actuator control signals, without altering the vehicle path, that may reduce the effect of road irregularities on ride comfort. The changes to actuator control signals may affect vehicle actuators 610 such as vehicle steering, braking, suspension controllers, and others. The example compensatory pre-control loading module 606 implements a prediction algorithm that can be trained using machine learning techniques to calculate changes to actuator control signals that may reduce the effect of road irregularities on ride comfort.

The example prediction algorithm adaption module 608 is configured to measure the actual vehicle performance when operating using the calculated actuator controls signals (e.g., using GPS and accelerometers) and provide input (e.g., algorithm gains using a learning algorithm) to adjust the prediction algorithm. The example prediction algorithm adaption module 608 is configured to receive input from dynamic sensors 612 (e.g., accelerometers) onboard the vehicle to measure the actual vehicle performance and provide gain adjustments for the prediction algorithm based on whether the vehicle ride comfort was improved over the net predicted vehicle disturbance deviation.

Figure 7:
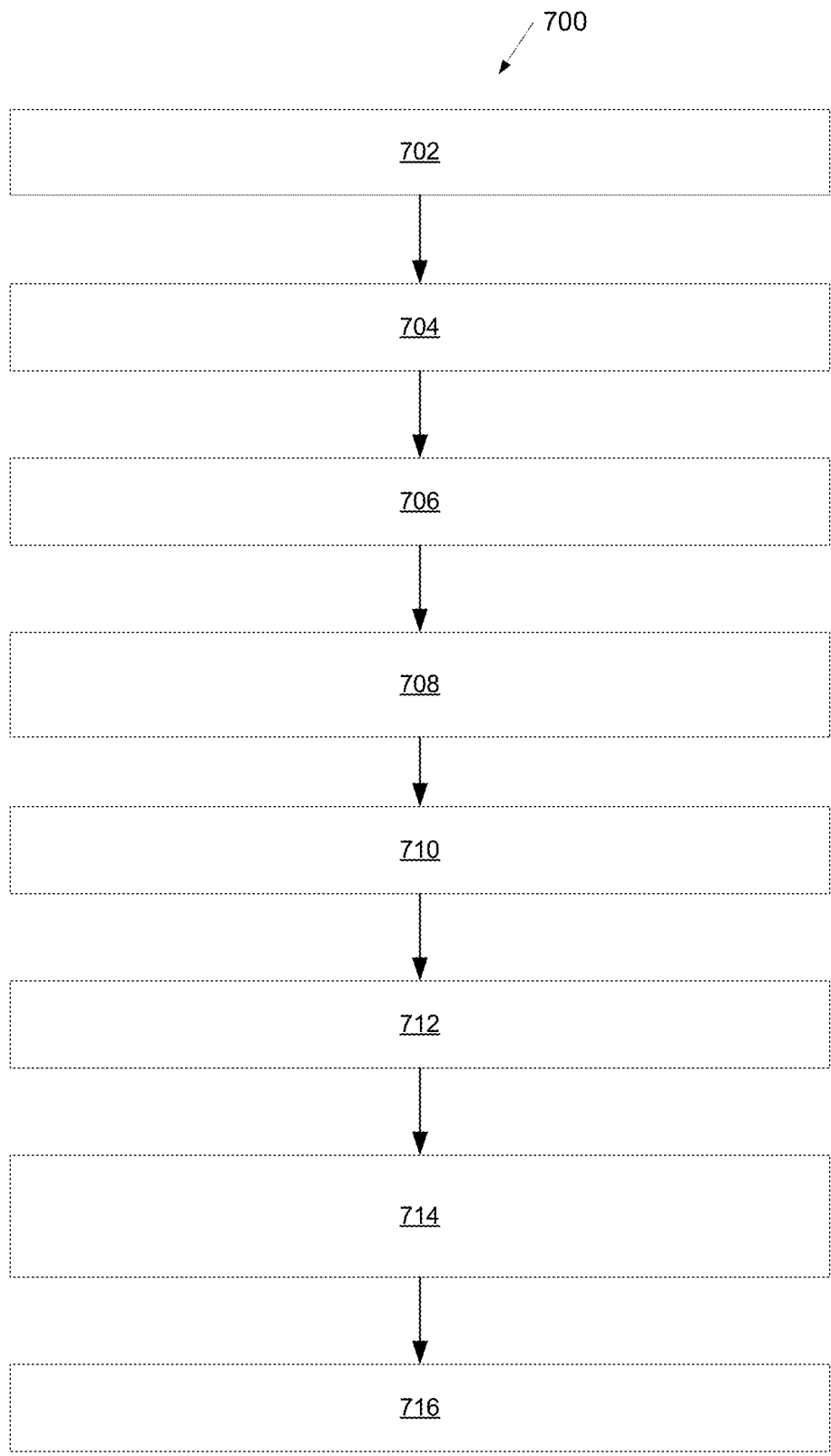
FIG. 7 is a process flow chart depicting an example process in a vehicle for calculating an alternative path trajectory within the constraints of road boundaries to avoid road irregularities when possible and to reduce motion dynamics for passengers in the vehicle to provide a more comfortable ride, in accordance with various embodiments.

FIG. 7 is a process flow chart depicting an example process 700 in a vehicle for calculating an alternative path trajectory within the constraints of road boundaries to avoid road irregularities when possible and to reduce motion dynamics for passengers in the vehicle to provide a more comfortable ride. The order of operation within the example process 700 is not limited to the sequential execution as illustrated in the figure but may be performed in one or more varying orders as applicable and in accordance with the present disclosure.

The example process 700 includes retrieving road surface information along a planned path for the vehicle (operation 702). The road surface information may include cloud-based road surface information stored in a cloud-based server and road surface information collected by on-board vehicle sensors such as radar, lidar and cameras. The planned path for the vehicle may be calculated by an autonomous path planner in the vehicle such as one within path planning system 78.

The example process 700 includes constructing a model of the road surface along the planned path (operation 704). The model of the road surface along the planned path may be constructed using the retrieved cloud-based surface information and the road surface information collected by on-board vehicle sensors. The model of the road surface along the planned path may comprise a series of points and lines represented as a three-dimensional (3D) profile matrix wherein the x-axis represents the distance down road, the y-axis represents the lateral position, and the z-axis represents the vertical position. The constructed 3D profile matrix may be uploaded to a cloud-based system for comparison with a cloud-based 3D profile matrix and updated by the cloud-based system. The updated 3D profile matrix may be downloaded to the vehicle.

The example process 700 includes identifying and classifying one or more road irregularities in the model of the road surface (operation 706). The identifying may include locating and classifying road irregularities using classification and threshold criteria. The identified road irregularities may include potholes and other larger scale irregularities (such as raised areas or depressions) on the roadway surface model. The example process 700 also includes projecting the location of vehicle tire patches on the model of the road surface (operation 708).

The example process 700 includes predicting vehicle sprung-mass dynamics as a function of time for the vehicle along the planned path (operation 710). Predicting vehicle sprung-mass dynamics as a function of time may include predicting forces at each vehicle kingpin (e.g., caused by road surface discontinuities and slope) using a second matrix representing the location of the vehicle tire patches relative to the vehicle center of gravity and a representative vehicle dynamics model.

The example process 700 includes calculating a plurality of alternative path trajectories within the constraints of the road boundaries for avoiding road irregularities (operation 712) and choosing an alternative path trajectory out of the plurality of alternative path trajectories that reduce the response/frequency dynamics for the sprung-mass to provide a more comfortable ride (or avoid the road irregularity) (operation 714). Calculating a plurality of alternative path trajectories and choosing an alternative path trajectory out of the plurality of alternative path trajectories may include calculating and testing, using cost functions (e.g., deep learning), a plurality of alternative path trajectories to identify alternative paths that reduce the response/frequency dynamics for the sprung-mass to provide a more comfortable ride (or avoid the road irregularity) within the constraints of the road boundaries (e.g., leveraging the existing path planner information) for avoiding road irregularities. The example process 700 further includes updating the planned path with the chosen alternative path trajectory (operation 716).

Figure 8:
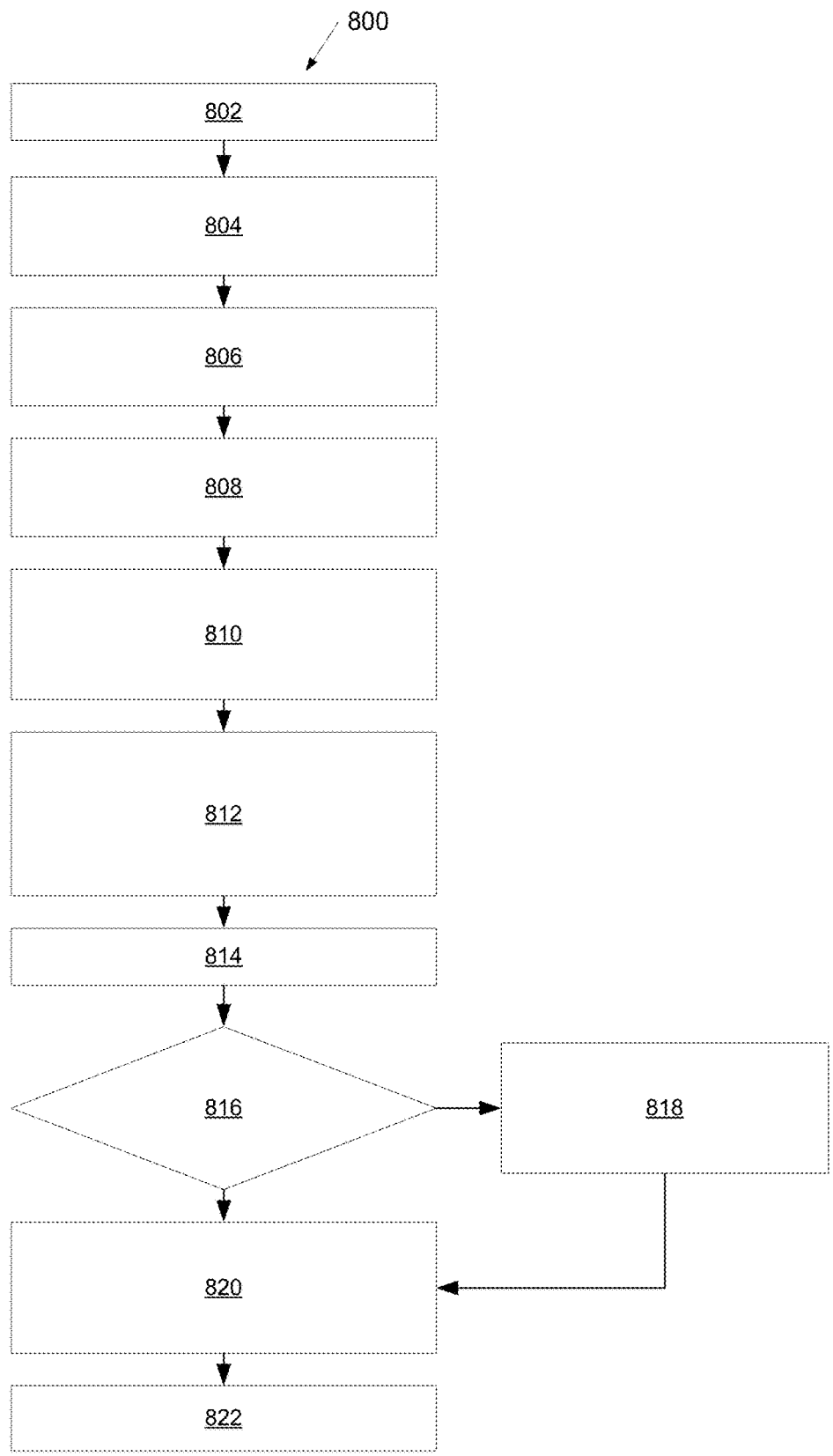
FIG. 8 is a process flow chart depicting an example process in a vehicle configured to reduce motion dynamics for passengers in the vehicle to provide a more comfortable ride, in accordance with various embodiments.

FIG. 8 is a process flow chart depicting an example process 800 in a vehicle configured to reduce motion dynamics for passengers in the vehicle to provide a more comfortable ride. The order of operation within the example process 800 is not limited to the sequential execution as illustrated in the figure but may be performed in one or more varying orders as applicable and in accordance with the present disclosure.

The example process 800 includes scanning a roadway along a planned path (operation 802) to create an actual road surface profile. The scanning may be performed using onboard vehicle sensors such as lidar, camera, radar, and ultrasonic sensors. The example process 800 includes comparing the actual road surface profile and a cloud road surface profile from a cloud-based database, determining differences and updating a cloud-based server with the differences (operation 804). The example process 800 includes calculating, using the actual road surface profile and sensor data such as GPS and accelerometer data, predicted tire patch locations along the planned path to create a time series forcing function for each vehicle tire (operation 806). The example process 800 includes receiving a driving controls input profile (e.g., for lateral and longitudinal control) (operation 808) and calculating predicted surface response plots representing ride and handling dynamics for the vehicle from future state tire inputs and stochastic wind forcing functions (operation 810). The example process 800 further includes applying a heuristic driving controls adjustment algorithm to define control loading time series inputs (e.g., for stability control, steering, braking, ride) to improve driver comfort using cloud data, surrounding traffic behavior, road surface mu, road material and weather conditions (operation 812).

The example process 800 is also configured to train the heuristic driving controls adjustment algorithm with real-time data. The example process 800 includes measuring vehicle dynamic response during vehicle operation using the control loading time series inputs (operation 814), for example, using GPS and accelerometers. The example process 800 includes determining if the vehicle dynamic response is improved due to implementing the control loading time series inputs (decision 816). When the vehicle dynamic response is not improved over a predicted dynamic response before implementing the control loading time series inputs (no at decision 816), the example process 800 includes adjusting control gains using a learning algorithm based on actual and predicted vehicle dynamic response (operation 818) and saving input control parameters associated with at least one of location, driving sequence, environmental factors, combination of each (operation 820). When the vehicle dynamic response is improved over a predicted dynamic response before implementing the control loading time series inputs (yes at decision 816), the example process 800 includes, confirming the control gains and saving input control parameters associated with at least one of location, driving sequence, environmental factors, combination of each (operation 820). The example process 800 further includes sending the input control parameters to a cloud-base server to store in a cloud-based database as a control/adjusted-control profile (operation 822).

Apparatus, systems, methods, techniques and articles are described for improving a vehicle's dynamic response to road imperfections and conditions by utilizing existing autonomous vehicle sensors. Onboard sensors, such as cameras, optical sensors, radar sensors, and/or LIDAR sensors may be used to scan the forward surface of the road to allow the vehicle to forecast vehicle dynamic response (e.g., in six degrees of freedom (6 DOF)) to road surface disturbances and to allow the vehicle to proactively make steering adjustments to avoid the road surface disturbances or to counter the effect of road surface disturbances.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A processor-implemented path planning method in a vehicle, the method comprising:
   retrieving road surface information along a planned path for the vehicle;
   constructing, by the processor, a model of the road surface along the planned path;
   identifying, by the processor, a road irregularity in the road surface for the planned path;
   classifying, by the processor, the road irregularity;
   projecting the location of vehicle tire patches on the model of the road surface;
   predicting, by the processor, vehicle sprung-mass dynamics as a function of time for the vehicle along the planned path;
   calculating a plurality of alternative path trajectories within constraints of the road boundaries for avoiding the road irregularity;
   choosing an alternative path trajectory out of the plurality of alternative path trajectories that reduce the sprung-mass dynamics for the vehicle to provide a more comfortable ride; and
   updating the planned path with the chosen alternative path trajectory.

2. The method of claim 1, wherein the road surface information comprises cloud-based road surface information and road surface information derived from onboard vehicle sensors.

3. The method of claim 1, wherein the model of the road surface along the planned path comprises a three-dimensional (3D) profile matrix wherein the x-axis represents the distance down road, the y-axis represents the lateral position, and the z-axis represents the vertical position.

4. The method of claim 3, further comprising uploading the 3D profile matrix to a cloud-based system for comparison with a cloud-based 3D profile matrix.

5. The method of claim 1, wherein predicting, by the processor, vehicle sprung-mass dynamics as a function of time comprises predicting forces at each kingpin using a representative vehicle dynamics model.

6. The method of claim 1, wherein calculating a plurality of alternative path trajectories and choosing an alternative path trajectory out of the plurality of alternative path trajectories comprises calculating and testing using cost functions a plurality of alternative path trajectories.

7. The method of claim 1, wherein choosing an alternative path trajectory that reduces the sprung-mass dynamics for the vehicle comprises choosing an alternative path that does not avoid the road irregularity but reduces the impact of the road irregularity on ride comfort.

8. The method of claim 1, wherein choosing an alternative path trajectory that reduces the sprung-mass dynamics for the vehicle comprises choosing an alternative path that avoids the road irregularity.

9. A ride comfort processor in a vehicle, the ride comfort processor comprising one or more processors configured by programming instructions in computer readable media, the ride comfort processor configured to:
   retrieve road surface information along a planned path for the vehicle;
   construct a model of the road surface along the planned path;
   project the location of vehicle tire patches on the model of the road surface;
   predict vehicle sprung-mass dynamics as a function of time for the vehicle along the planned path;
   calculate and select alternative vehicle controls that reduce the sprung-mass dynamics along the planned path; and
   update vehicle control inputs with the alternative vehicle controls.

10. The processor of claim 9, further configured to:
    identify a road irregularity in the road surface for the planned path; and
    classify the road irregularity.

11. The processor of claim 10, wherein to calculate and select alternative vehicle controls that reduce the sprung-mass dynamics along the planned path, the ride comfort processor is configured to:
    calculate a plurality of alternative path trajectories within the constraints of the road boundaries for avoiding the road irregularity; and
    choose an alternative path trajectory out of the plurality of alternative path trajectories that reduces the sprung-mass dynamics for the vehicle to provide a more comfortable ride.

12. The processor of claim 11, wherein to update vehicle control inputs with the alternative vehicle controls, the ride comfort processor is configured to update the planned path with the chosen alternative path trajectory.

13. The processor of claim 9, wherein to predict vehicle sprung-mass dynamics as a function of time for the vehicle along the planned path, the ride comfort processor is configured to:
    receive a driving controls input profile for lateral and longitudinal control; and
    calculate predicted surface response plots representing ride and handling dynamics for the vehicle from future state tire inputs and stochastic wind forcing functions.

14. The processor of claim 13, wherein to calculate and select alternative vehicle controls that reduce the sprung-mass dynamics along the planned path, the ride comfort processor is configured to:
  apply a heuristic driving controls adjustment module to define control signals for stability control, steering, and braking actuators.

15. The processor of claim 14, wherein the ride comfort processor is further configured to:
  measure vehicle dynamic response after implementing the control signals; and
  adjust control gains in the heuristic driving controls adjustment module.

16. The processor of claim 15, wherein to adjust gains in the heuristic driving controls adjustment module, the ride comfort processor is configured to:
  compare actual vehicle sprung-mass dynamics using the control signals to the predicted vehicle sprung-mass dynamics;
  when the actual vehicle sprung-mass dynamics are not improved from the predicted vehicle sprung-mass dynamics, the ride comfort processor is configured to adjust the control gains using a learning algorithm; and
  when the actual vehicle sprung-mass dynamics are improved from the predicted vehicle sprung-mass dynamics, the ride comfort processor is configured to confirm the control gains.

17. The processor of claim 14, further configured to send the control signals to a cloud-based server.

18. A method in a vehicle for improving driver comfort, the method comprising:
  scanning a roadway along a planned path to create an actual road surface profile;
  comparing the actual road surface profile with a road surface profile from a cloud-based database, determining differences, and updating a cloud-based server with the differences;
  calculating, using the actual road surface profile, predicted tire patch locations along the planned path to create a time series forcing function for each vehicle tire;
  receiving a driving controls input profile;
  calculating predicted surface response plots representing ride and handling dynamics for the vehicle from future state tire inputs and stochastic wind forcing functions;
  applying a heuristic driving controls adjustment module to define control signals to improve driver comfort using cloud data, surrounding traffic behavior, surface mu, road material and weather conditions; and
  sending input control parameters from the control signals to the cloud-based server to store in the cloud-based database.

19. The method of claim 18, further comprising:
  measuring vehicle dynamic response after implementing the control signals; and
  adjusting control gains in the heuristic driving controls adjustment module.

20. The method of claim 19, wherein adjusting control gains in the heuristic driving controls adjustment module comprises:
  when actual vehicle sprung-mass dynamics are not improved using the control signals, adjusting the control gains using a learning algorithm; and
  when the actual vehicle sprung-mass dynamics are improved, confirming the control gains.

* * * * *